United States Patent
Annambhotla et al.

(10) Patent No.: US 8,190,607 B2
(45) Date of Patent: May 29, 2012

(54) METHOD FOR TAGGING MEDIA CONTENT, PORTABLE ELECTRONIC DEVICE, AND COMPUTER PROGRAM

(75) Inventors: Srinivas Annambhotla, Cary, NC (US); Muralimohan Gopalakrishna, Morrisville, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 349 days.

(21) Appl. No.: 12/557,929

(22) Filed: Sep. 11, 2009

(65) Prior Publication Data
US 2011/0066642 A1 Mar. 17, 2011

(51) Int. Cl.
*G06F 7/00* (2006.01)
*G06F 17/30* (2006.01)

(52) U.S. Cl. ........ 707/736; 707/770; 707/822; 707/912; 707/E17.009; 455/414.1; 455/456.1; 455/456.2; 725/86; 725/87

(58) Field of Classification Search .................. 707/736, 707/770, 822, 913, E17.009; 455/414.1, 455/456.1, 456.2; 725/86, 87
See application file for complete search history.

(56) References Cited

U.S. PATENT DOCUMENTS

| | | | | |
|---|---|---|---|---|
| 2002/0166123 A1* | 11/2002 | Schrader et al. | ................. | 725/58 |
| 2006/0098899 A1* | 5/2006 | King et al. | ..................... | 382/305 |
| 2006/0235869 A1 | 10/2006 | Nagahashi | | |
| 2007/0162971 A1* | 7/2007 | Blom et al. | ...................... | 726/17 |
| 2007/0282907 A1* | 12/2007 | Chambers | .................. | 707/104.1 |
| 2008/0027983 A1* | 1/2008 | Erol et al. | .................. | 707/104.1 |
| 2008/0183758 A1* | 7/2008 | Kennedy | ..................... | 707/104.1 |
| 2009/0049237 A1* | 2/2009 | Sivakumar et al. | ........... | 711/113 |
| 2009/0094518 A1* | 4/2009 | Lawther et al. | ................ | 715/716 |
| 2009/0150406 A1* | 6/2009 | Giblin | ............................. | 707/10 |
| 2010/0130226 A1* | 5/2010 | Arrasvuori et al. | ......... | 455/456.1 |
| 2010/0332437 A1* | 12/2010 | Samadani | ..................... | 707/802 |
| 2011/0138326 A1* | 6/2011 | Roberts et al. | ................ | 715/808 |

FOREIGN PATENT DOCUMENTS
WO WO 2008/104495 A1 9/2008

OTHER PUBLICATIONS

Lyndon J. B. Nixon and Elena Paslaru Bontas Simperl—"Makna and MultiMakna: towards semantic and multimedia capability in Wikis for the emerging Web"—this paper is supported by the EU Network of Excellence Knowledge Web (FP6-507482) Proceedings of the Semantics, 2006—Citeseer (pp. 1-15).*

Preetha Appan, Hari Sundaram and David Birchfield—"Communicating Everyday Experiences"—Proceedings of the 1st ACM workshop on Story representation, mechanism and context, SRMC'04, Oct. 15, 2004,, ACM (pp. 17-24:1-8).*

(Continued)

*Primary Examiner* — John E Breene
*Assistant Examiner* — Anh Ly
(74) *Attorney, Agent, or Firm* — Renner, Otto, Boisselle & Sklar, LLP

(57) ABSTRACT

A method for tagging media content captured by a portable electronic device is disclosed. The method comprises determining a time for capturing of a piece of media content; connecting, via the Internet, to at least one bulletin service; acquiring from the at least one bulletin service, a data string indicating information associated with the determined time; and including the data string into metadata associated with the piece of media content. A portable electronic device and a computer program are also disclosed.

11 Claims, 2 Drawing Sheets

OTHER PUBLICATIONS

International Search Report, corresponding to PCT/EP2010/053068, mailed on May 17, 2010.

Written Opinion, corresponding to PCT/EP2010/053058, mailed on May 17, 2010.

Sarn, S. et al.,: "On Automatic Contextual Metadata Generation fo Personal Digital Photographs" Proc. $9^{th}$, Int. Conf. on Advanced Communication Technology, IEEE, Feb. 12-Feb. 14, 2007 pp. 66-71, XP002580279, Piscataway, NJ, USA abstract pp. 66, right-hand column, line 32—p. 67, let-hand columns 3, p. 67, left-hand, line 3 p. 67, left hand column, line 5-line 18; figure 1 p. 68, left-hand column, line 32—right-hand column, the 32 right hand column, line 11.

"In the News—Toward More Intelligent Healthcare—Life Annotation: Storing and Searching Our Personal Digitized Memories" IEEE Intelligent Systems, vol. 22, No. 2, Mar. 2007 pp. 5-8, XP002580280 USA, p. 8, col. c, line 7—right-hand column, line 39, figure.

Boll, S. et al.: "Semantics, Content, and Structure of Many for the Creation of Personal Photo Albums" Proc. $15^{th}$. ACM Int. Conf. on Multimedia MM' 07. Sep. 24, 2007-Sep. 29, 2007 pp. 641-650 XP002580281, Augsburg, Bavaria, abstract, p. 641, right-hand column, line 43—p. 642, left-hand column, line 12, p. 643, line 31-line 41, p. 644, left-hand column, line 12-line 34; figure 2.

* cited by examiner

METHOD FOR TAGGING MEDIA CONTENT, PORTABLE ELECTRONIC DEVICE, AND COMPUTER PROGRAM

TECHNICAL FIELD

The present invention relates to a method for tagging media content captured by a portable electronic device, such a portable electronic device, and a computer program for implementing the method.

BACKGROUND

Tagging of media content, such as pictures or video clips, captured by a portable electronic device, such as a digital camera or a cellular phone with camera, is a neat way of remembering for example when the media content was captured. With the spread of digital technology, the ability to capture loads of pictures and video clips is very prevalent; hence this feature is more important than ever. Manual tagging is known from, for example WO 2008/104495 A1, where a user is able to input notes that are stored as metadata. Automatic tagging by including the time is also known, for example by the storing of the files associated with the captured media content based on time. However, these tags are either time consuming for the user (manual input) or blunt from a perspective of human associations (automatic input). It is therefore a desire to provide an approach for improved tagging of captured media content.

SUMMARY

The present invention is based on the understanding that associations to a recollection, which in this context is substantiated by a piece of captured media content, are made by associated events in time, position, and/or topic. The inventors have found that news, and especially headlines, being associated in time, position, and/or topic, can be used for a less blunt and less time consuming, respectively, way of tagging. News and headlines are easily found on the Internet where the presence of news and headlines can be considered as a type of bulletin service. Thus, by adding data retrieved from the Internet, having a relation to the capturing of the media content in at least one of time, position, and topic, to metadata associated with the media content, an automatic and associative tagging is enabled.

According to a first aspect, there is provided a method for tagging media content captured by a portable electronic device. The method comprises determining a time for capturing of a piece of media content; connecting, via the Internet, to at least one bulletin service; acquiring from the at least one bulletin service, a data string indicating information associated with the determined time; and including the data string into metadata associated with the piece of media content.

The connecting may further comprise establishing a communication channel via a transceiver and modem circuitry to a wireless access system.

The metadata may be stored in a metadata field of the file of the captured media content, in a meta data file separate from the file of the captured media content, or in a database with an index associating the metadata to the file of the captured media content.

The method may further comprise determining a position for the capturing of the piece of media content, wherein information of the data string is also associated with the determined position.

The method may further comprise receiving a user defined topic, wherein information of the data string is also associated with the topic.

According to a second aspect, there is provided a portable electronic device comprising a media content capturing circuitry; a memory connected to the media content capturing circuitry for storing captured media content; and a media content handling controller arranged to assign metadata to media content stored in the memory. The media content handling controller is arranged to determine a time of capturing of a piece of media content; connect, via the Internet, to at least one bulletin service; acquire from the at least one bulletin service, a data string indicating information associated with the determined time; and include the data string into metadata associated with the piece of media content.

The device may further comprise a transceiver and modem circuitry arranged to communicate with a wireless access system, wherein the connection to the Internet is performed via the wireless access system by the transceiver and modem circuitry.

The media content handling circuitry may be arranged to store the metadata in a metadata field of the file of the captured media content, in a metadata file separate from the file of the captured media content, or in a database with an index associating the metadata to the file of the captured media content.

The device may further comprise circuitry arranged to determine a position of the device such that position for the capturing of the piece of media content is determined, wherein information of the data string is also associated with the determined position.

The device may further comprise a user interface arranged to receive a user defined topic, wherein information of the data string is also associated with the topic.

According to a third aspect, there is provided a computer readable medium comprising program code with instructions arranged to be executed by a processor of a portable electronic device, wherein the instructions cause the portable electronic device to perform the method according to the first aspect.

DETAILED DESCRIPTION

Figure 1:
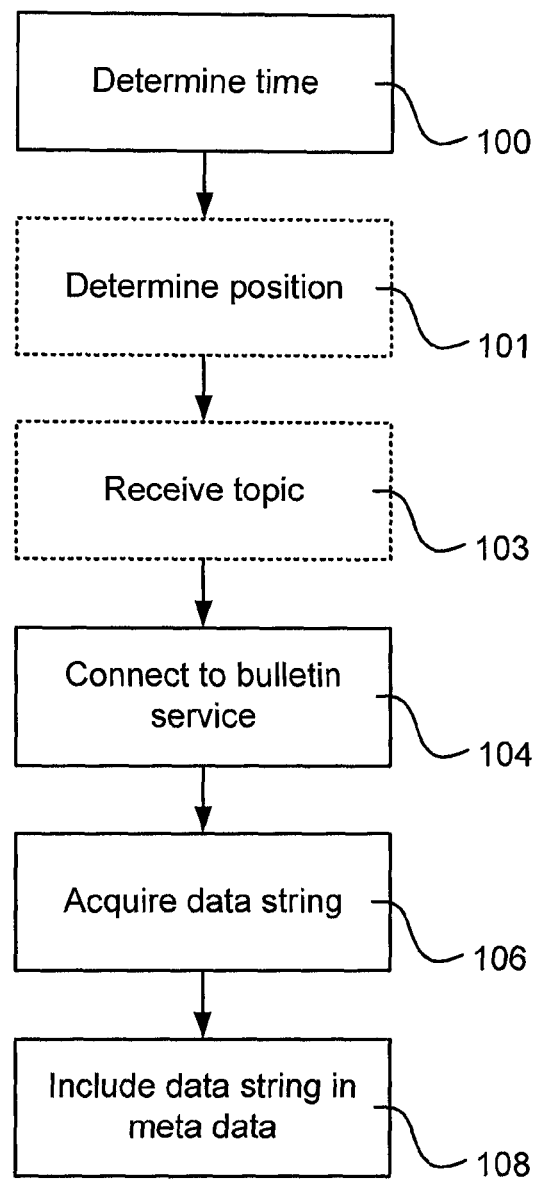
FIG. 1 is a flow chart schematically illustrating a method according to an embodiment.

Portable electronic devices such as mobile phones and consumer electronic devices available in the market today, may support features like geo-tagging and date/time for photographs taken using an integrated camera in such a device. Features like geo-tagging and date/time are primarily meant to help the user keep track of the various memorable moments in his/her life and let him/her correlate the photographed events with the location and date/time of the events he/she has captured using the camera in the device.

However, the date/time printed along with the photograph is just another day in the calendar with little or no special significance without any other associations. In this disclosure, there is proposed a novel tagging scheme that will let the user correlate the significant event in his/her life (personal event) with a significant public event.

There can be an application that will reside alongside the camera or camera function. This may let the user choose the types of events that interest him/her. The application can also let the user select the granularity of the public events, i.e. he/she may choose e.g. country level or city/town or global events, or his/her favorite team, etc. He/she can also choose the granularity of time. For example, he/she may choose the events that occurred in the last 1 hour before the photograph or video clip was captured, or events that may have occurred that day, or the most popular events that may have occurred that calendar year, etc. Based on the user's preferences, the application will connect to the internet and select at least one headline, or a list of headlines that the user could choose from, which may be related to public events he/she has subscribed for. Upon the selection of an event by the user, the application will store the headline as metadata for the photograph or video clip.

It will here be illustrated with an example:

Bob was on a vacation to Las Vegas. During the trip, he extensively used the cellular phone with camera function having a tagging mechanism according to the approach of this disclosure.

He takes a lot of pictures, and in a settings menu of a tagging application, he chooses both global and countrywide events. He also selects his areas of interest as Politics/Sports. The application, in the background, connects to the internet and scours for the latest headlines that match Bob's settings. The application can also leverage from an integrated positioning unit, such as a GPS unit in the handset to deduce Bob's position, which detects the country as USA. The application shows Bob, the following headlines, for example in the order of popularity/relevance:

1. 44th President of the USA elected. (Reuters Headlines)
2. Carolina Hurricanes beat Montreal Canadians 1-0 in a playoff Hockey Game. (Carolina Hurricanes Team headline)
3. Global Warming Effects on Hoover Dam (Local event based on GPS).
4. Yankees Rodriguez hits home run first game of the season. (Yankee Fan site)

Bob is a Fan of Carolina Hurricanes and New York Yankees so he has decided to have the events from these fan sites as part of his available tags for a picture.

Since the first headline is the most popular and since it's also a significant event, in Bob's perspective, he chooses it. The application then stores this information as metadata for the pictures in his gallery that were taken on the particular day.

Five years later, when Bob is flipping through his photo gallery, the photos tagged with the application not only display the date/time and location information but also the event headline(s) that was stored for the day.

A second example is demonstrated below to illustrate the invention further:

Sandy goes to Washington D.C. for Spring break and is walking on the historical grounds and takes pictures of all the cherry trees filled with flowers with a portable electronic device according to the approach of this disclosure. Sandy chooses local GPS based events in the application. Based on this preference, our application could bring up the following headline: "Best HANAMI Season in Washington D.C. in 60 years". Sandy necessarily does not know about the significance of her trip that day. However the application enables her to gain access to very useful trivia information to share with friends and family on how beautiful the trees were, and how lucky she was to be visiting Washington on that particular historic occasion.

This way, Bob and Sandy each get a chance to automatically correlate an event of personal significance with an event of public significance.

FIG. 1 is a flow chart schematically illustrating a method according to an embodiment. In a time determination step 100, the time when a media content was captured is determined. Optionally, in a position determination step 101, the position is also determined, e.g. by help from a global navigation satellite system. Also optionally, an area of interest based on the user configuration (set via a user interface) in a topic reception step 103. The time, position and/or topic will be used for finding and selecting news and/or headlines. In a connection step 104, connection is established to the Internet, where news and/or headlines are found and selected. Here, the mechanism of finding and selecting is summed up as a 'bulletin service', and can be performed under control of an application locally at the portable electronic device of the user, or by a service provided e.g. on a server on the Internet or at a service provider. Based on the found and selected news and/or headlines, a string of data suitable for storing as metadata is acquired in a data string acquisition step 106. The data string acquisition step 106 can include a selection by the user among candidates of news/headlines. The acquired data string is then stored as metadata associated with the captured media content in a metadata inclusion step 108.

Figure 2:
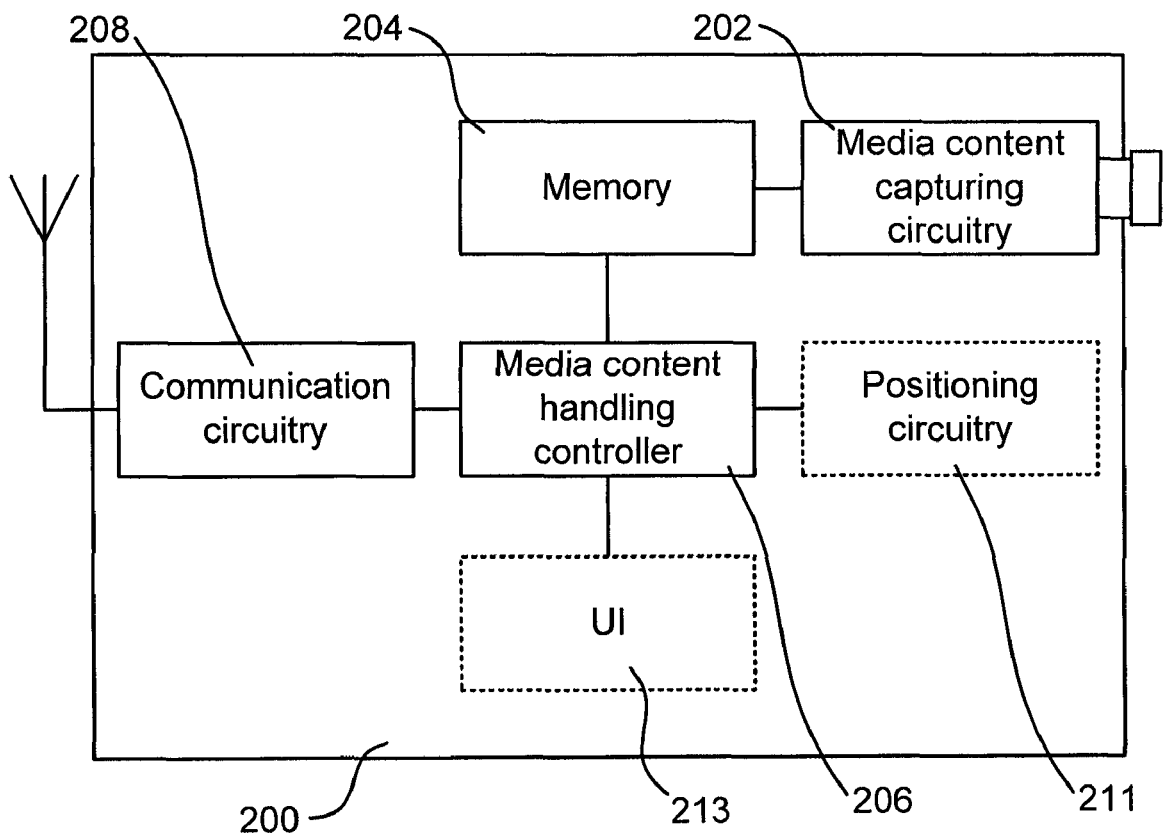
FIG. 2 is a block diagram schematically illustrating a portable electronic device according to an embodiment.

FIG. 2 is a block diagram schematically illustrating a portable electronic device 200 according to an embodiment. The portable electronic device 200, which for example can be a cellular phone or a digital camera, comprises a media content capturing circuitry 202 which is able to take a digital photograph or video clip, i.e. the media content. The media content is stored in a memory 204. A media content handling controller 206 assigns metadata associated with the stored piece of media content. The metadata can be stored in a metadata field of the file of the captured media content, in a metadata file separate from the file of the captured media content, or in a database with an index associating the metadata to the file of the captured media content. The media content handling controller 206 is preferably a circuit with processing capabilities, and can be implemented in a central processing unit of the portable electronic device 200. The media content handling controller 206 provides criterion or criteria for news/headlines to find that on the Internet, which is accessed via a communication circuitry 208 which provides access via a wireless access network, e.g. a cellular network or an ad hoc network or wireless local access network. The criterion or criteria can be time, position and/or topic. The position is preferably related to a position of the portable electronic device 200 given by an optional positioning circuitry 211, e.g. a GPS receiver. The topic is preferably related to a selection made by the user through a user interface 213 of the portable electronic device 200, e.g. by keywords or selection of predefined topics. The media content handling controller 206 receives found news/headlines via the communication circuitry 208 and stores them as metadata associated with the captured piece of media content.

Figure 3:
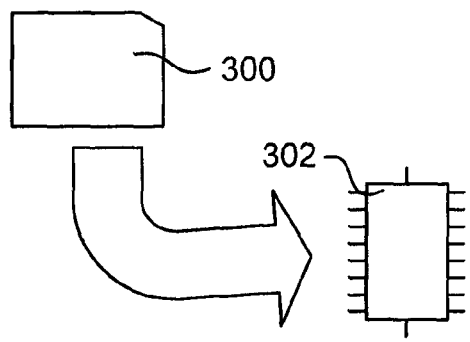
FIG. 3 schematically illustrates a computer readable medium comprising a computer program.

The method according to the present invention is suitable for implementation with aid of processing means, such as computers and/or processors of the portable electronic devices. Therefore, there is provided computer programs, comprising instructions arranged to cause the processing means or processor of the portable electronic device to perform the steps of the method according to the embodiments described with reference to FIG. 1. The computer program preferably comprise program code which is stored on a computer readable medium 300, as illustrated in FIG. 3, which can be loaded and executed by a processing means or processor 302 of the portable electronic device to cause it to perform the methods, respectively, according to embodiments of the present invention, preferably as the embodiments described with reference to FIG. 1. The processor 302 and computer program product 300 can be arranged to execute the program code sequentially where actions of the any of the methods are performed stepwise, but can also be arranged to perform the actions on a real-time basis, i.e. actions are performed upon request and/or available input data. The processing means or processor 302 is preferably what normally is referred to as an embedded system. Thus, the depicted computer readable medium 300 and processor 302 in FIG. 3 should be construed to be for illustrative purposes only to provide understanding of the principle, and not to be construed as any direct illustration of the elements.

The invention claimed is:

1. A computer-implemented method for tagging media content captured by a portable electronic device, the method comprising:
    determining a region level of interest and a time range;
    determining a time for capturing of a piece of media content;
    connecting, via the Internet, to at least one bulletin service;
    acquiring from the at least one bulletin service, a data string indicating information associated with the determined region level of interest and associated with a time within the determined time range, the determined time range encompassing the determined time for capturing of the piece of media content; and
    including the data string into metadata associated with the piece of media content,
    wherein the metadata is stored in a metadata field of the file of the captured media content, in a metadata file separate from the file of the captured media content, or in a database with an index associating the metadata to the file of the captured media content.

2. The method according to claim 1, wherein the connecting further comprises establishing a communication channel via a transceiver and modem circuitry to a wireless access system.

3. The method according to claim 1, wherein the metadata is stored in a metadata field of the file of the captured media content, in a metadata file separate from the file of the captured media content, or in a database with an index associating the metadata to the file of the captured media content.

4. The method according to claim 1, further comprising determining a position for the capturing of the piece of media content, wherein information of the data string is also associated with the determined position.

5. The method according to claim 1, further comprising receiving a user defined topic, wherein information of the data string is also associated with the topic.

6. A portable electronic device comprising:
    a media content capturing circuitry;
    a memory connected to the media content capturing circuitry for storing captured media content; and
    a media content handling controller arranged to assign metadata to media content stored in the memory, wherein the media content handling controller is arranged to
    determine a time of capturing of a piece of media content;
    connect, via the Internet, to at least one bulletin service;
    acquire from the at least one bulletin service, a data string indicating information associated with a determined region level of interest and associated with a time within a determined time range, the determined time range encompassing the determined lime of capturing of, the piece of media content; and
    include the data string into metadata associated with the piece of media content,
    wherein the media content handling circuitry is arranged to store the metadata in a metadata field of the file of the captured media content, in a metadata file separate from the file of the captured media content, or in a database with an index associating the metadata to the file of the captured media content.

7. The device according to claim 6, further comprising a transceiver and modem circuitry arranged to communicate with a wireless access system, wherein the connection to the Internet is performed via the wireless access system by the transceiver and modem circuitry.

8. The device according to claim 6, wherein the media content handling circuitry is arranged to store the metadata in a metadata field of the file of the captured media content, in a metadata file separate from the file of the captured media content, or in a database with an index associating the metadata to the file of the captured media content.

9. The device according to claim 6, further comprising circuitry arranged to determine a position of the device such that position for the capturing of the piece of media content is determined, wherein information of the data string is also associated with the determined position.

10. The device according to claim 6, further comprising a user interface arranged to receive a user defined topic, wherein information of the data string is also associated with the topic.

11. A computer readable medium comprising program code with instructions arranged to be executed by a processor of a portable electronic device, wherein the instructions cause the portable electronic device to perform the method according to claim 1.

* * * * *

UNITED STATES PATENT AND TRADEMARK OFFICE
CERTIFICATE OF CORRECTION

PATENT NO.        : 8,190,607 B2
APPLICATION NO.   : 12/557929
DATED             : May 29, 2012
INVENTOR(S)       : Annambhotla et al.

Page 1 of 1

It is certified that error appears in the above-identified patent and that said Letters Patent is hereby corrected as shown below:

Claim 6, Column 6, line 17, replace "encompassing the determined lime of capturing of, the" with --encompassing the determined time of capturing of the--.

Signed and Sealed this
Seventh Day of August, 2012

David J. Kappos
*Director of the United States Patent and Trademark Office*